US007693954B1

(12) United States Patent
Hughes et al.

(10) Patent No.: US 7,693,954 B1
(45) Date of Patent: Apr. 6, 2010

(54) SYSTEM AND METHOD FOR DIRECT TO ARCHIVE DATA STORAGE

(75) Inventors: James P. Hughes, Herndon, VA (US);
Ravi K. Kavuri, Inver Grove Heights, MN (US); Tru Q. Dam, Maple Grove, MN (US); Shanthi Paladugu, Plymouth, MN (US)

(73) Assignee: Storage Technology Corporation, Louisville, CO (US)

( * ) Notice: Subject to any disclaimer, the term of this patent is extended or adjusted under 35 U.S.C. 154(b) by 981 days.

(21) Appl. No.: 11/018,324

(22) Filed: Dec. 21, 2004

(51) Int. Cl.
*G06F 15/167* (2006.01)
(52) U.S. Cl. .................. 709/213; 709/214; 709/216; 711/4
(58) Field of Classification Search .......... 709/212–216
See application file for complete search history.

(56) References Cited

U.S. PATENT DOCUMENTS

| 6,061,504 A | * | 5/2000 | Tzelnic et al. ............. 709/219 |
| 6,804,719 B1 | * | 10/2004 | Cabrera et al. ............. 709/226 |
| 7,194,656 B2 | * | 3/2007 | Hayward ...................... 714/6 |
| 2002/0161855 A1 | * | 10/2002 | Manczak et al. ............ 709/219 |
| 2004/0249904 A1 | * | 12/2004 | Moore et al. ................ 709/216 |
| 2005/0018384 A1 | * | 1/2005 | Schnitter .................... 361/523 |
| 2005/0102549 A1 | * | 5/2005 | Davies et al. ................ 714/4 |
| 2005/0188248 A1 | * | 8/2005 | O'Brien et al. .............. 714/5 |

* cited by examiner

*Primary Examiner*—Phuoc Nguyen
(74) *Attorney, Agent, or Firm*—Brooks Kushman P.C.

(57) ABSTRACT

A system for data storage includes a switch node, a meta-data server, a plurality of storage servers having at least one respective data storage device, and a scalable interconnect. The scalable interconnect couples the switch node, the meta-data server, and the storage servers. At least one of the switch node, the meta-data server and the storage servers includes a hierarchical storage manager (HSM). When information is received at the switch node, the HSM presents the information substantially simultaneously to the storage servers for storage at the respective data storage devices.

14 Claims, 2 Drawing Sheets

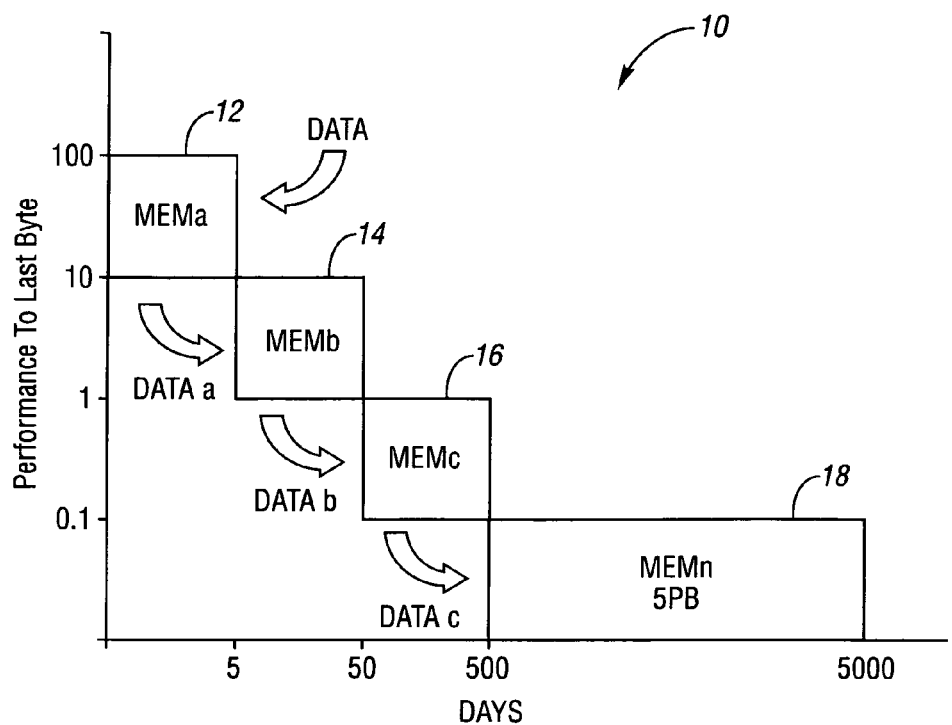
Fig. 1 (Conventional)

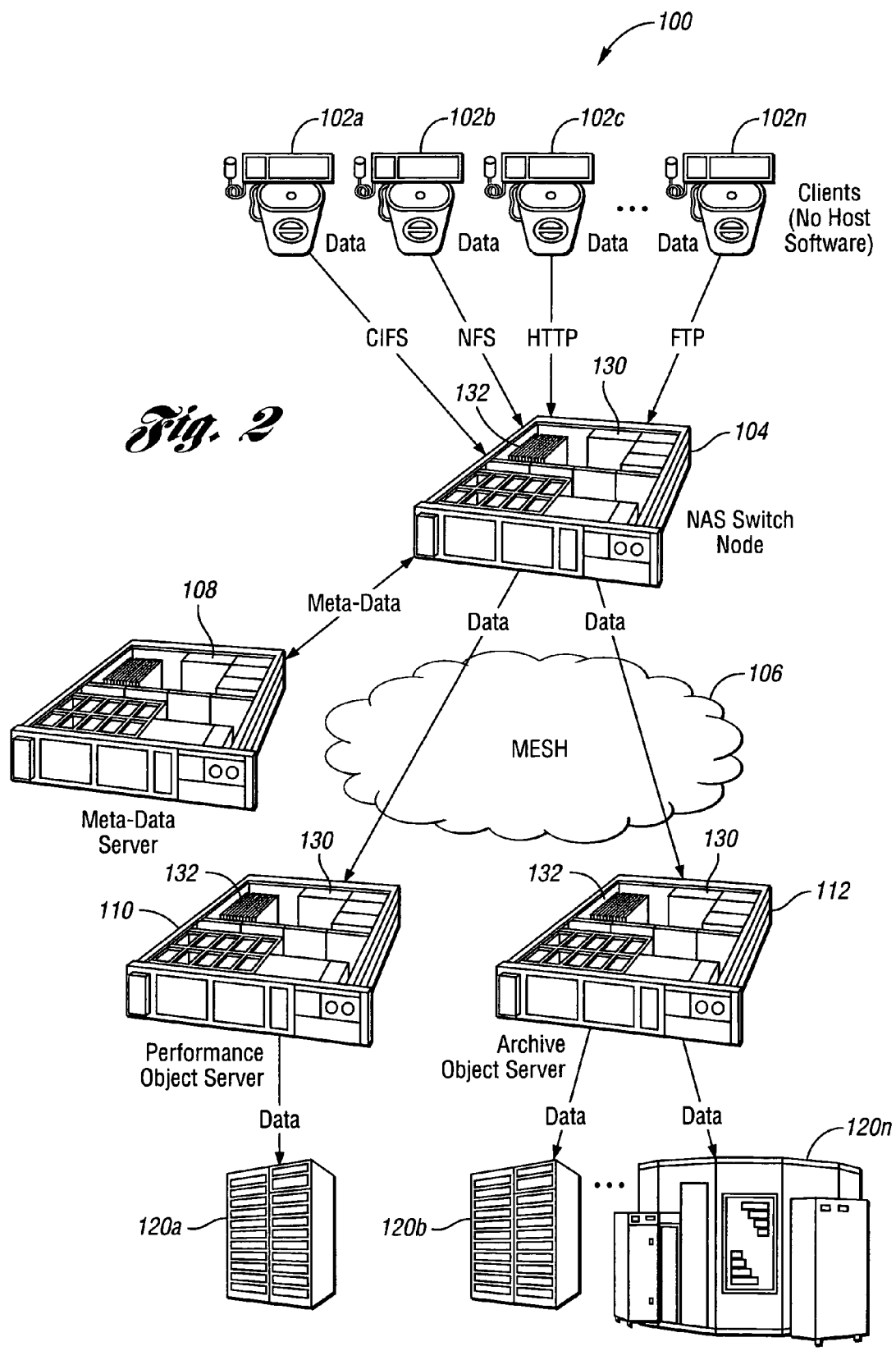

SYSTEM AND METHOD FOR DIRECT TO ARCHIVE DATA STORAGE

BACKGROUND OF THE INVENTION

1. Field of the Invention

The present invention relates to a system and method for direct to archive data storage.

2. Background Art

Conventional data file storage systems use Hierarchical Storage Management/Manager (HSM) to move data from one storage class (i.e., category, type, etc.) to another as the information ages. Data is initially stored in a memory that has a high reliability and access performance rating because the data is only stored at that memory. Predetermined policy decisions dictate the size of memory, the level of memory performance for reliability and for access time, and the length of time that data is stored at a particular level of memory. After the predetermined time has expired, data is transferred from high performance memory to successively lower performance memory. The successively lower performance memories are typically successively larger sized memories.

Referring to FIG. 1, a diagram of a conventional data storage system 10 is shown. The data storage system 10 includes a memory 12 (e.g., MEMa), a memory 14 (e.g., MEMb), a memory 16 (e.g., MEMc), and a memory 18 (e.g., MEMn). The memories 12, 14, 16, and 18 generally have decreasing performance requirements, increasing aging criteria, and increasing capacities. For example, in an example of a typical conventional data storage system, information (e.g., DATA) is stored in the memory 12 (e.g., as DATAa) for five days and when the data has aged five days in the memory 12, the data (e.g., DATAa) is transferred to the memory 14 (e.g., stored as DATAb). When the data has aged 50 days in the memory 14, the data (e.g., DATAb) is transferred to the memory 16 (e.g., stored as DATAc). When the data has aged 500 days in the memory 16, the data (e.g., DATAc) is transferred to the memory 18. Information that is stored in the memory 18 can be held for 5,000 days or longer.

The performance of the memories 12, 14, 16, and 18 may be normalized and rated for performance to last byte on a generally logarithmic scale where increased speed of access and data transfer (e.g., inverse of access and data transfer time) is plotted. For example, the memory 12 may be a memory having an extremely rapid information access and transfer (i.e., extremely short information access and transfer time) and a performance rating of 10-100. The memory 14 may be a memory having a rapid information access and transfer (i.e., short information access and transfer time) and a performance rating of 1-10. The memory 16 may be a memory having a slow information access and transfer (i.e., slow information access and transfer time) and a performance rating of 0.1-1. The memory 18 may be a memory having a very slow information access and transfer (i.e., very slow information access and transfer time) and a performance rating of up to 0.1.

The size (i.e., storage capacity) of the memories 12, 14, 16, and 18 is typically matched to the amount of data that is expected to be stored by a user during the duration of the time interval for the memory. For example, the memory 12 can be a 5 TB memory, the memory 14 can be a 45 TB memory, the memory 16 can be a 450 TB memory, and the memory 18 can be a 5 PB memory.

Data stored at a particular memory for a predetermined duration of time and is transferred to the next successively lower performance memory as the data ages (becomes stale). For example, after the data has aged 5 days the data is transferred from memory 12 to memory 14, after the data has aged 50 days the data is transferred from memory 14 to memory 16, after the data has aged 500 days the data is transferred from memory 16 to memory 18. Each successive transfer of data has a potential for introduction of errors that are not detected by error correction measures. Errors that are introduced can be transferred without detection to successive lower stages of memory.

Thus there exists an opportunity and need for an improved system and method for a data storage systems that addresses the deficiencies in conventional data storage system approaches.

SUMMARY OF THE INVENTION

The present invention generally provides a system and a method for new, improved and innovative techniques for a data storage system that addresses deficiencies in conventional approaches. The improved system and method of the present invention generally provides reliable data at all levels of aging and reduces system data transfer complexity.

According to the present invention, a system for data storage is provided. The system comprises a switch node, a meta-data server, a plurality of storage servers having at least one respective data storage device, and a scalable interconnect. The scalable interconnect couples the switch node, the meta-data server, and the storage servers. At least one of the switch node, the meta-data server and the storage servers includes a hierarchical storage manager (HSM). When information is received at the switch node, the HSM presents the information substantially simultaneously to the storage servers for storage at the respective data storage devices.

Also according to the present invention, a method of managing data storage is provided. The method comprises interconnecting a switch node, a meta-data server, and a plurality of storage servers having at least one respective data storage device using a scalable interconnect, and presenting information substantially simultaneously to the storage servers for storage at the respective data storage devices using a hierarchical storage manager (HSM) when the information is received at the switch node.

Further, according to the present invention, for use in a data storage system, a hierarchical storage manager (HSM) is provided. The manager comprises a processor and a memory. The memory includes programming to perform the steps of interconnecting a switch node, a meta-data server, and a plurality of storage servers having at least one respective data storage device using a scalable interconnect, and presenting information substantially simultaneously to the storage servers for storage at the respective data storage devices using a hierarchical storage manager (HSM) when the information is received at the switch node.

The above features, and other features and advantages of the present invention are readily apparent from the following detailed descriptions thereof when taken in connection with the accompanying drawings.

BRIEF DESCRIPTION OF THE DRAWINGS

FIG. 1 is a diagram of a conventional data storage system;

FIG. 2 is a diagram of a data storage system of the present invention; and

DETAILED DESCRIPTION OF THE PREFERRED EMBODIMENT(S)

Figure 3:
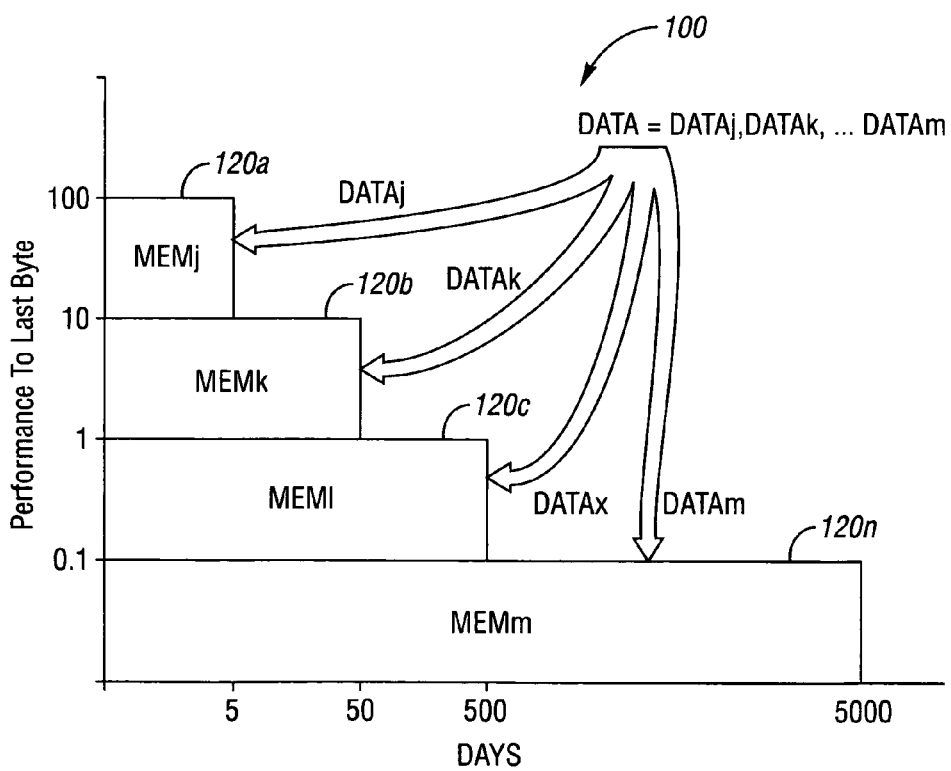
FIG. 3 is a diagram of an alternative representation of the data storage system of the present invention.

With reference to the Figures, the preferred embodiments of the present invention will now be described in detail. Generally, the present invention provides an improved system and method for new and innovative techniques for the implementation of data storage systems.

The following abbreviations, acronyms and definitions are generally used in the Background and Summary above and in the Description below.

API: Application Program(ming) Interface

CIFS: Common Internet File Services (Microsoft), Common Internet File System (Sun)

Data object: A file that comprises data and procedures (i.e., routines, subroutines, ordered set of tasks for performing some action, etc.) to manipulate the data.

Data striping: Segmentation of logically sequential data, such as a single file, so that segments can be written to multiple physical devices (usually disk drives) in a round-robin fashion. This technique is useful if the processor is capable of reading or writing data faster than a single disk can supply or accept the data. While data is being transferred from the first disk, the second disk can locate the next segment. Data striping is different from, and may be used in conjunction with, mirroring (see below).

DMF: Data Management File

FS: File server(s)

FTP: File Transfer Protocol

GNU: Self-referentially, short for GNUs not UNIX, a UNIX-compatible software system developed by the Free Software Foundation (FSF).

Hash: A function (or process) that converts an input (e.g., a input stream of data) from a large domain into an output in a smaller set (i.e., a hash value, e.g., an output stream). Various hash processes differ in the domain of the respective input streams and the set of the respective output streams and in how patterns and similarities of input streams generate the respective output streams. One example of a hash generation algorithm is Secure Hashing Algorithm-1 (SHA-1). Another example of a hash generation algorithm is Message Digest 5 (MD5). The hash may be generated using any appropriate algorithm to meet the design criteria of a particular application.

HSM: Hierarchical Storage Management (or Manager), A self managing storage system of multiple hierarchies.

HTTP: Hyper Text Transfer Protocol (World Wide Web protocol)

LUSTRE (or Lustre): An association of the words Linux and Clusters. Lustre is a storage and file system architecture and implementation suitable for very large clusters. Lustre is Open Source software developed and maintained by Cluster File Systems, Inc., Cluster File Systems, Inc., 110 Capen St., Medford, Mass. 02155, USA, under the GNU General Public License.

MDS: Meta-data server

Meta-data: Data about data. Meta-data is definitional data that provides information about or documentation of other data managed within an application or environment. For example, meta-data would document data about data elements or attributes, (name, size, data type, etc) and data about records or data structures (length, fields, columns, etc) and data about data (where it is located, how it is associated, ownership, etc.). Meta-data may include descriptive information about the context, quality and condition, or characteristics of the data.

Mirroring: Writing duplicate data to more than one device (usually two hard disks), in order to protect against loss of data in the event of device failure. This technique may be implemented in either hardware (sharing a disk controller and cables) or in software. When this technique is used with magnetic tape storage systems, it is usually called "twinning".

NAS: Network Attached Storage

NFS: Network File Server (or System)

OST: Object Storage Target(s)

Prefixes: Mega (M), $10^6$; Giga (G), $10^9$; Tera (T), $10^{12}$; Peta (P), $10^{15}$; Exa (E), $10^{18}$ SAMBA (or Samba): A suite of programs running under UNIX-like operating systems that provide seamless integration between UNIX and Windows machines. Samba acts as file and print servers for DOS, Windows, OS/2 and other Server Message Block (SMB) client machines. Samba uses the SMB protocol which is the underlying protocol used in Microsoft Windows networking. For many networks Samba can provide a complete replacement for Windows NT, Warp, NFS or Netware servers. Samba most commonly would be used as a SMB server to provide Windows NT and LAN Manager style file and print services to SMB clients such as Windows 95, OS2 Warp, smbfs and others. Samba is available for a number of platforms such as AIX, BSDI, Bull, Caldera, Debian, DigitalUnix, IRIX, OSF, SCO, Slackware, SuSE, TurboLinux, HP, MVS, Novell, RedHat, Sinix, Solaris, VMS, and others. Samba is available under GNU public license.

UML: Unified Modeling Language (Object Management Group, OMG)

UUID: Universal User Identity (or Identifier)

The system and method of the present invention generally provide for relaxed (i.e., generally lower) overall system reliability and data movement (i.e., transfer) values (e.g., specifications, guidelines, etc.) than are implemented in connection with conventional approaches. As such, the overall system cost is generally lower for the present invention than for conventional approaches, while system performance, in terms of reliability and access times, is generally equal to or better than conventional approaches.

The system and method of the present invention generally provides generating (i.e., creating, producing, making, etc.) a copy of information (i.e., data, objects, etc.) at all storage hierarchies (i.e., at all time durations of memory) at once (i.e., substantially, approximately, about, essentially etc. simultaneously).

The system and method of the present invention generally provides for generating multiple backup copies (i.e., copies at all storage hierarchies), and provides for the elimination of transfer of data from one memory to another as the data ages (i.e., becomes stale, matures, etc.) past a normal information storage duration. The stored information is generally more reliable and more robust because the information is generally stored at a plurality of storage hierarchies and the risk of erroneous transfer of information from one memory to another is eliminated (or, at least, reduced) when compared to conventional approaches to data storage systems.

As information matures at a given level of memory, the information is generally deleted from a respective memory when the information ages past a predetermined storage duration. The information is generally stored as a lower total overall amount at successively slower storage hierarchies. A unique hierarchical storage management (HSM) is implemented that provides protection (i.e., robust storage) of information across all memory hierarchies when the information is initially stored.

Referring to FIG. 2, a diagram of a data storage system 100 of the present invention is shown. The system 100 generally comprises at least one client 102 (e.g., clients 102a-102n), a network attached storage (NAS) switch node 104, a scalable mesh (i.e., interconnect, fabric, etc.) 106, at least one metadata server (MDS) 108, at least one performance objective server (or target) (OST) 110, at least one archive objective server (or target) (OST) 112, and a plurality of data storage devices 120 (e.g., data storage devices 120a-120n). The system 100 is generally implemented as an object-based data storage area network (SAN) system.

The system 100 is generally includes a hierarchical storage management (HSM) appliance for self management of storage system having multiple hierarchies. The node 104 and the servers 108, 110 and 112 each generally include a processor (e.g., controller, microprocessor, etc.) 130 and a memory 132 (e.g., RAM, ROM, PROM, flash, etc.). The HSM is generally implemented in connection with at least one processor 130 and memory 132 (e.g., software, firmware, hardware, or a combination thereof).

The clients 102 may be coupled to the NAS switch node 104. The clients 102 are generally implemented as interfaces using protocols such as CIFS (e.g., the client 102a), NFS (e.g., the client 102), HTTP (e.g., the client 102c), FTP (e.g., the client 102n), and the like. However, the clients 102 may implement any appropriate protocol to meet the design criteria of a particular application. The clients 102 generally present information (e.g., DATA) to the node 104.

The node 104 is generally coupled to the mesh 106 and the server 108. However, in one example (not shown), the server 108 may be coupled to the node 104 via the mesh 106. The node 104 may generate meta-data and at least one data object (e.g., META-DATA) that correspond to (i.e., are related to) respective information DATA. The meta-data and object META-DATA may be managed (i.e., stored, updated, processed, compared, etc.) by the server 108 and communicated to and from the node 104 via (or in connection with) the information DATA.

The node 104 generally receives the information DATA and distributes (i.e., presents, transmits, sends, etc.) the information DATA to the servers 110 and 112 substantially simultaneously (shown in more detail in FIG. 3). When the information DATA is presented to the servers 110 and 112, the information DATA is generally presented to and stored on respective storage devices 120 by the servers 110 and 112.

The server 110 is generally implemented as a server configured to provide high performance (i.e., rapid) data access of information that is stored on the device 120a. The server 112 is generally implemented as a server configured to provide efficient archival of information that is stored on the respective devices 120 (e.g., the devices 120b-120n).

As illustrated in FIG. 3, performance of the memories 120 may be normalized and rated for performance to last byte on a generally logarithmic scale where increased speed of access and data transfer (e.g., inverse of access and data transfer time) is plotted. For example, the memory 120a (i.e., the storage device that is coupled to the performance object server 110) may be a memory having an extremely rapid information access and transfer (i.e., extremely short information access and transfer time) and a performance rating of 10-100.

The memory 120b (i.e., one of the storage devices that is coupled to the archive object server 112) may be a memory having a rapid information access and transfer (i.e., short information access and transfer time) and a performance rating of 1-10. A memory 120x (i.e., another storage device that is coupled to the archive object server 112, and shown in FIG. 3) may be a memory having a slow information access and transfer (i.e., slow information access and transfer time) and a performance rating of 0.1-1. The memory 120n (i.e., yet another storage device that is coupled to the archive object server 112) may be a memory having a very slow information access and transfer (i.e., very slow information access and transfer time) and a performance rating of up to 0.1.

The storage devices 120 may be implemented as appropriate types of storage devices to meet the design criteria of a particular application. For example, in one implementation, the storage device 120a may be implemented as a high speed access disk storage system. The storage device 120b may be implemented as a disk storage system having a slower access speed than the device 120a. The storage device 120x may be implemented as a high speed access tape storage system. The storage device 120n may be implemented as a tape storage system having a slower access speed than the device 120x.

Referring again to FIG. 3, a diagram of an alternative representation of the data storage system 100 of the present invention is shown. The data storage system 100 includes the memory (or data storage device) 120a (e.g., MEMj), the memory (or data storage device) 120b (e.g., MEMk), the memory (or data storage device) 120x (e.g., MEMl), and the memory (or data storage device) 120n (e.g., MEMm). The memories 120 generally have decreasing performance requirements, increasing aging criteria, and increasing capacities. Data stored at a particular memory for a predetermined duration of time and is generally deleted (i.e., erased, made inaccessible, etc.) as the data ages (i.e., becomes stale, matures, etc.) past the normal access time interval.

For example, in one example of the data storage system 100, information (e.g., DATA=DATAj, DATAk, DATAl, DATAx, DATAm, etc.) received at the node 104 is stored in the memory 120a for five days and when the data has aged five days in the memory 120a, the data is deleted from the memory 120a. When the data has aged 50 days in the memory 120b, the data is deleted from the memory 120b. When the data has aged 500 days in the memory 120x, the data is deleted from the memory 120x. Information that is stored in the memory 120n can be held for 5000 days or longer prior to deletion. The present invention avoids the steps of copying information through successive memories as the information ages as is performed in conventional approaches. As such, the potential for introduction of errors that are not detected by error correction measures is eliminated or significantly reduced.

The size (i.e., storage capacity) of the memories (i.e., data storage devices) 120 is typically matched (i.e., predetermined, established, chosen, selected, etc.) to the amount of data that is expected to be stored by a user during the duration of the time interval for the memory. The storage capacity of successive ones of the memories 120 may be implemented having nominally about ten times the size, a preferred range of twice the size to fifty times the size, and a most preferred range of five times the size to twenty-five times the size of the previous time storage interval memory. For example, the memory 120a may be implemented as a 5 TB memory, the memory 14 can be a 50 TB memory, the memory 16 can be a 500 TB memory, and the memory 18 can be a 5 PB memory. However, the storage capacity of the memories 120a-120n may be selected as any appropriate size to meet the design criteria of a particular application.

As is readily apparent from the foregoing description, then, the present invention provides an improved data storage system that has an overall system cost that is generally lower for than for conventional approaches, while system performance, in terms of reliability and access times, is generally better than conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for data storage, the system comprising:
    a switch node;
    a meta-data server;
    a plurality of storage servers having at least one respective data storage device; and
    a scalable interconnect to couple the switch node, the meta-data server, and the storage servers, wherein at least one of the switch node, the meta-data server and the storage servers includes a hierarchical storage manager (HSM), and when information is received at the switch node, the HSM presents the information substantially simultaneously to the storage servers for storage at the respective data storage devices and the information is deleted from the storage devices after respective predetermined time durations, wherein the storage capacity of the storage devices is predetermined to an amount of data expected to be stored by a user during the respective predetermined time duration, and the storage capacity of each successively increasing time duration storage device is within a preferred range of twice the size to fifty times the size of the previous time duration storage device, and a most preferred range of five times the size to twenty-five times the size of the previous time duration storage device.

2. The system according to claim 1 wherein the switch node is a network attached storage (NAS) switch node.

3. The system according to claim 1 further comprising at least one client coupled to the switch node, and the at least one client presents the information to the switch node.

4. The system according to claim 1 wherein the system is an object-based data storage system.

5. The system according to claim 1 wherein the storage servers are performance and archive storage servers.

6. The system according to claim 1 wherein the storage capacity of each successively increasing time duration storage device is about ten times the size of the previous time duration storage device.

7. A method of managing data storage, the method comprising:
    interconnecting a switch node, a meta-data server, and a plurality of storage servers having at least one respective data storage device using a scalable interconnect;
    presenting information substantially simultaneously to the storage servers for storage at the respective data storage devices using a hierarchical storage manager (HSM) when the information is received at the switch node; and
    deleting the information from the storage devices after respective predetermined time durations, wherein the storage capacity of the storage devices is predetermined to an amount of data expected to be stored by a user during the respective predetermined time duration, and the storage capacity of each successively increasing time duration storage device is within a preferred range of twice the size to fifty times the size of the previous time duration storage device, and a most preferred range of five times the size to twenty-five times the size of the previous time duration storage device.

8. The method according to claim 7 the wherein the switch node is a network attached storage (NAS) switch node.

9. The method according to claim 7 further comprising coupling at least one client to the switch node, and the at least one client presents the information to the switch node.

10. The method according to claim 7 wherein the HSM, the storage servers and the data storage devices comprise an object-based data storage system.

11. The method according to claim 7 wherein the storage servers are performance and archive storage servers.

12. The method according to claim 7 wherein the storage capacity of each successively increasing time duration storage device is about ten times the size of the previous time duration storage device.

13. For use in a data storage system, a hierarchical storage manager (HSM), the manager comprising:
    a processor; and
    a memory, wherein the memory includes programming to perform the steps of:
        interconnecting a switch node, a meta-data server, and a plurality of storage servers having at least one respective data storage device using a scalable interconnect;
        presenting information substantially simultaneously to the storage servers for storage at the respective data storage devices using a hierarchical storage manager (HSM) when the information is received at the switch node; and
        deleting the information from the storage devices after respective predetermined time durations, wherein the storage capacity of the storage devices is predetermined to an amount of data expected to be stored by a user during the respective predetermined time duration, and the storage capacity of each successively increasing time duration storage device is within a preferred range of twice the size to fifty times the size of the previous time duration storage device, and a most preferred range of five times the size to twenty-five times the size of the previous time duration storage device.

14. The manager according to claim 13 wherein the information is deleted from the storage devices after respective predetermined time durations.

* * * * *